Aug. 5, 1969   M. ROSNER   3,459,975
METHOD FOR LOAD REGULATION OF MAGNETOHYDRODYNAMIC
(MHD) POWER PLANTS
Filed June 5, 1967

⊗ B

INVENTOR.
Manfred Rosner
BY
Pierce, Scheffler & Parker
Attorneys

United States Patent Office 3,459,975
Patented Aug. 5, 1969

3,459,975
**METHOD FOR LOAD REGULATION OF MAG-
NETOHYDRODYNAMIC (MHD) POWER PLANTS**
Manfred Rosner, Wettingen, Switzerland, assignor to
Aktiengesellschaft Brown, Boveri & Cie, Baden,
Switzerland, a joint-stock company
Filed June 5, 1967, Ser. No. 643,569
Claims priority, application Switzerland, June 29, 1966,
9,444/66
Int. Cl. G21d 7/02; H02k 45/00
U.S. Cl. 310—11
5 Claims

ABSTRACT OF THE DISCLOSURE

A power plant system comprising in succession a combustion chamber, MHD converter, diffuser, two combustion air preheater units, with valve controlled by-pass ducts for decreasing the air preheat temperature with deviation from normal load, steam heating and seed reclaiming sections and a stack. The burners in the combustion chamber are distributed over its cross section with burners near the chamber wall operated with an air ratio greater than one and secondary air inlets are provided in the converter and diffuser walls.

---

Figure 1:
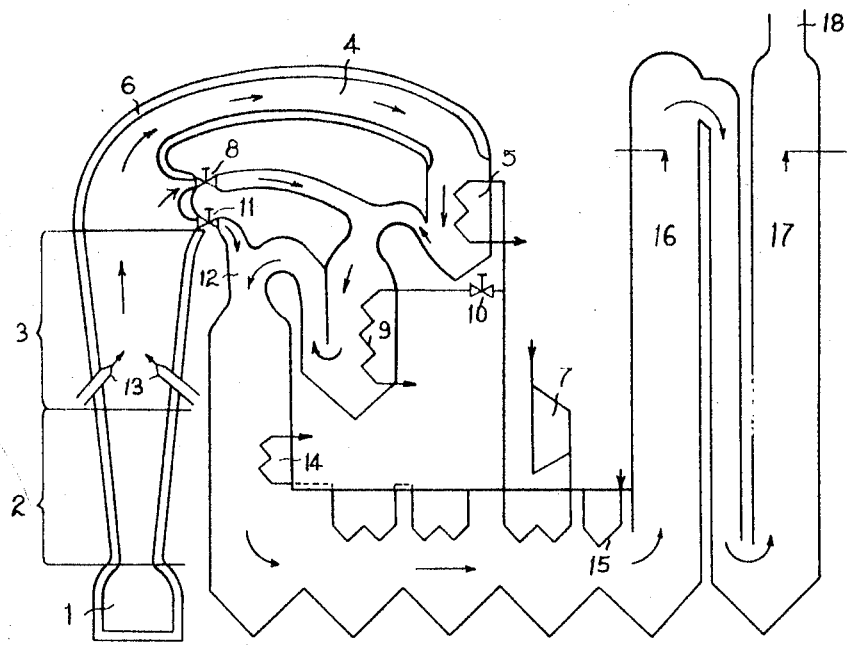

The present invention relates to a method for regulating the output of a magnetohydrodynamic (MHD) power plant where a combustion gas, produced by burning fossil fuel and to which seed material has been added to increase the electrical conductivity, passes through the MHD duct and then through a combustion air preheater, the combustion air/fuel ratio for the normal output of the power plant corresponding approximately to the stoichiometric ratio.

Various methods are known for controlling MHD power plants, according to which, for example, the adaptation to the required controlled state is achieved by varying the amount of seed material added, or the magnetic induction or the air preheating temperature. These known methods have the disadvantage that deviations from the normal output are accompanied by a deterioration of the efficiency of the power plant. If the air preheating temperature is varied for control purposes, the air preheater must be designed in addition for a relatively wide temperature range, which leads to corresponding expensive solutions.

It is a principal object of the present invention to provide a mehtod for regulating the output of a MHD power plant which avoids the disadvantages of the known methods and where the efficiency of the power plant is substantially maintained when the output varies.

The method according to the invention is characterized in that, in the case of a deviation from the normal output, the combustion air ratio is so far reduced from the stoichiometric ratio, both for increasing and for reducing the output, that the efficiency of the power plant is at least approximately maintained, that the combustion air-preheating temperature and the seed material/fuel ratio remains substantially constant, and that secondary air is fed to the combustion gas, after the MHD duct, for complete after-combustion. It is known that the efficiency of a MHD power plant, with the other parameters remaining constant, shows, in its dependence on the gas velocity in the MHD-duct, a maximum at which the layout for the normal output is effected, as usual.

The invention is based on the discovery that, with a given geometric construction and equal air preheating temperature, the attainable mean temperature as well as the attainable specific electrical conductivity of the combustion gas at the outlet of the combustion chamber, with a lower combustion air ratio $\lambda$ ($\lambda$=actual amount of air to stoichiometric amount of air) up to $\lambda$=0.85 is higher than with the parameter of the layout state ($\lambda$=1). Calculations have shown that it is possible to restore the original efficiency by reducing the combustion air ratio according to the invention, in the case of deviations from the normal output, while keeping at the same time the combustion-air-preheating temperature constant.

The reduction of the combustion air ratio $\lambda$ below the value 1 makes after-combustion necessary. To this end secondary air is fed to the combustion gas current, after the MHD duct, for complete after-combustion.

In the control mechanism according to the invention it is assumed that the addition of seed material per unit of fuel, and the air-preheating temperature can be kept substantially constant. The first condition can be met simply by adding the seed material to the fuel. Keeping the air preheating temperature constant requires in general special control measures which are familiar to the man skilled in the art. From the principle of the constancy of the air preheating temperature results, as another advantage of the method according to the invention, that the air preheater can be operated constantly at its limiting temperature determined by the material. This limiting temperature can be about 835 deg. C. in the case of austenitic steels. This air preheating-end temperature will suffice for a few practical cases and permits relatively cheap conventional heat exchanger constructions. If an even higher air preheating end temperature is to be used, there is the possibility of using a ceramic heat-exchanger, though there is still some uncertainty about its construction principles and possibilities. It is certain, however, that substantially constant temperature conditions in the ceramic heat exchanger considerably simplify its construction problems.

Figure 2:
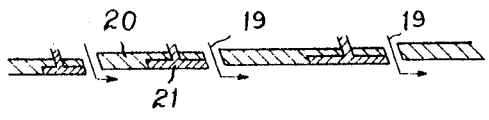
Figure 2:
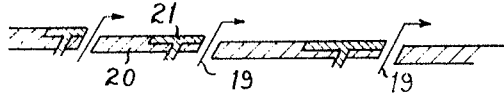

The method according to the invention will be hereinafter described more fully in connection with the accompanying drawings wherein:

FIG. 1 is a schematic representation of an MHD power plant with an after-connected steam power plant stage, where the method can be used with advantage; and FIG. 2 is a fragmentary longitudinal section through the wall of the MHD energy conversion duct showing certain details thereof.

With reference now to the drawings and to FIG. 1 in particular, a suitable fossil fuel, for example, a residual oil, which is premixed with a suitable seed material, is burnt in the combustion chamber 1 with preheated combustion air in a regulable ratio. At the outlet of the combustion chamber 1 is connected the MHD duct 2 which is joined by a diffusor 3. A part of the combustion gases issuing from the diffusor 3 is fed to a first air preheater 5 through a line 4. The combustion chamber 1, the MHD duct 2, the diffusor 3 and the line 4 are surrounded by a cooling jacket 6 which keeps the parts of the plant in contact with the combustion gas at a desired temperature.

A part of the combustion air fed from the regulable compressor 7 is brought to a constant preheating temperature in the air preheater 5. The colder combustion gas leaving the first air preheater 5 is re-heated, by mixing with hot combustion gas tapped over the regulable throttle 8, substantially to the same temperature as the inlet of the air preheater 5, and is fed to a second air preheater 9 which brings the remaining portion of the combustion air, which can be regulated over the throttle 10, to the required constant preheating temperature. The combustion gas leaving the seocnd air-preheater 9 is finally mixed with the combustion gas fed over the regulable throttle 11 and fed at 12 to the after-connected conventional steam power plant unit. The after-connected steam power plant stage comprises among other elements the auxiliary turbine (not represented in FIG. 1) for the mechanical direct and regulable drive of the compressor 7. For the complete after-combustion, secondary air is injected after the MHD duct through the nozzles 13 and ensures a complete after-combustion of the combustion gases. After the combustion gas has delivered the remaining effective heat to the steam cycle 14 and the feed water pre-heater 15 respectively, it flows through the wash towers 16, 17, serving to recover the seed material, and thence through the line 18 to the chimney. The rate of flow of the fuel and of the combustion air, as well as the variable quantities at the important points of the various cycles are determined by means of corresponding measuring instruments, which are not represented in the drawing for reasons of clairity.

The measures in the transition from normal load to a controlled state consist according to the invention in a corresponding variation of the fuel supply as well as in the establishment of a reduced combustion air ratio, predetermined for this state, where the original power plant efficiency is achieved again. The measures for keeping the combustion air-preheating temperature constant consist in a corresponding regulation of the tapping of combustion gas over the throttles 8 and 11 in such a way that the temperatures of the partial amounts of combustion air delivered by the two preheaters 8 and 11 remain at the determined value, independent of the output regulation.

Due to the reduction of the combustion air ratio $\lambda$ below the value 1, the combustion gas has, in the MHD duct, a reducing effect which can prevent the use of certain materials, which are otherwise advantageous for the construction of the MHD duct wall. This disadvantage can be remedied in a simple way by providing the combustion chamber with several burners distributed over its cross section, the burner in the vicinity of the combustion chamber wall being operated with a combustion air ratio of $\lambda$ greater than 1 even when the mean combustion air ratio $\lambda$ determinant for the output regulation is less than 1. Tests have shown that such a profile of the gas compositions, which is variable over the cross section, is still partly maintained in the MHD duct, so that the reducing gas portions are concentrated in the center of the duct and arrive at the duct wall only in low concentration.

In order to prevent completely the appearance of reducing gas portions along the wall of the MHD duct, the duct wall is provided with transverse slots, each wall section having at least one pair of electrodes to deliver the electric current. FIG. 2 shows such a MHD duct in a longitudinal section. The combustion gas, brought to a sufficiently high electrical conductivity by the addition of seed material, flows in the direction of the arrow, while a constant magnetic field B is produced in the direction perpendicularly to the drawing plane. The duct wall is divided by transverse slots 19 into wall sections 20 which have at least one pair of electrodes 21. Secondary air is fed to the combustion gas through these transverse slots 19, which in addition to permitting free thermal expansion of the wall sections 20 also prevent the appearance of reducing gases along the wall of the MHD duct. Since the necessary number of transverse slots 19 decreases in the direction of flow, due to the diminishing turbulence of the secondary air with the combustion gas in the direction of flow, it is advisable to design to MHD duct so that the length of the wall sections 20 increases in the direction of flow, each wall section having the same number of electrodes 21. Because of the decreasing power density in the direction of flow, the electrode gaps are preferably so laid out that each pair of electrodes delivers about the same power which is favorable in a Faraday connection for the dimensioning of the inverters.

I claim:
1. In the method of regulating the output of a magnetohydrodynamic power plant wherein combustion gas produced by burning fossil fuels and mixed with seed material to increase the electrical conductivity flows through the magnetohydrodynamic conversion duct and thence through an air preheater for the combustion chamber in which the fuel is burned and wherein the combustion air-fuel ratio corresponds approximately to the stoichiometric value for the normal power output of the plant, the improvement for the case of a deviation from the normal output both decreasing and increasing from normal to maintain the efficiency of the plant which comprises the steps of decreasing the combustion air ratio from said stoichiometric value, maintaining the combustion air-preheating temperature substantially constant, maintaining the seed material/fuel ratio substantially constant, and feeding secondary combustion air to the remaining combustion gas downstream from the magnetohydrodynamic conversion duct.

2. The method as defined in claim 1 for regulating the output of a magnetohydrodynamic power plant wherein the combustion chamber is provided with a plurality of burners distributed over its cross section to lower the concentration of reducing gases along the wall of the magnetohydrodynamic conversion duct which comprises the further step of operating those burners in the proximity of the combustion chamber wall with a combustion air ratio greater than 1, the mean combustion air ratio being determinant for regulation of the plant output.

3. The method as defined in claim 1 for regulating the output of a magnetohydrodynamic power plant wherein the wall of the magnetohydrodynamic conversion duct is provided with transverse slots to establish wall sections which permit thermal expansion thereof, and which includes the further step of introducing additional secondary air through said slots in order to impede the flow of reducing gases along the wall surface of said duct.

4. The method as defined in claim 3 for regulating the output of a magentohydrodynamic power plant wherein each wall section of said magnetohydrodynamic conversion duct is provided with the same number of electrodes and wherein the length of said wall sections increase in the direction of flow of the combustion gas.

5. The method as defined in claim 4 for regulating the output of a magnetohydrodynamic power plant as defined in claim 4 wherein each pair of electrodes delivers approximately the same amount of electrical power from said duct.

References Cited

UNITED STATES PATENTS

| | | | |
|---|---|---|---|
| 3,211,932 | 10/1965 | Hundstad | 310—11 |
| 3,303,364 | 2/1967 | Hals | 310—11 |

DAVID X. SLINEY, Primary Examiner